Patented June 16, 1942

2,286,542

UNITED STATES PATENT OFFICE 2,286,542

ISOMERIZATION OF NORMAL PARAFFINIC HYDROCARBONS

Heinz Heinemann, Pampa, Tex., assignor to the firm Danciger Oil & Refineries, Inc., Tulsa, Okla.

No Drawing. Application December 3, 1940, Serial No. 368,276

18 Claims. (Cl. 260—676)

My invention relates to the isomerization of normal paraffinic hydrocarbons, and it has particular relation to an improved process for isomerizing said hydrocarbons, in which process a composition containing antimony compounds is used as a catalytic agent.

Friedel-Crafts agents, such as aluminium chloride and other metallic halides, which have been proposed as catalytic agents for the isomerization of normal paraffinic hydrocarbons, have not shown satisfactory effects. It has been suggested, therefore, to use hydrogen chloride as an activator for said metallic halide catalysts. Instead of the highly corrosive hydrogen chloride activator, halides of boron have been suggested. However, these compounds are unstable, particularly in the presence of moisture, and are also corrosive.

I have now found that isomerization of normal paraffinic hydrocarbons can be carried out without the use of corrosive or unstable substances, with favorable yields, and with little or no decomposition, by treating such hydrocarbons at isomerization temperature in the presence of a catalytic composition which contains a metal halide known in anhydrous form as a Friedel-Crafts catalyst and a suitable antimony compound of the type hereinafter described.

In carrying out this invention, I treat the normal paraffinic hydrocarbon at isomerization temperature in the presence of a catalytic agent containing one of the above mentioned metal halides, wholly or partly dissolved in water, and an oxygen containing compound of pentavalent antimony, the metal halide being in excess. These catalytic compositions are suitable for isomerizing normal paraffinic hydrocarbons, such as normal butane or mixtures of normal paraffin hydrocarbons, and such isomerization may be effected at any suitable pressure in liquid, vapor or mixed liquid-vapor phase. As a catalytic agent, a metal halide known in anhydrous form as a Friedel-Crafts agent, such as zinc chloride, aluminium chloride, ferric chloride or the like may be used. These catalysts may also be used in a form modified with an alkali metal halide, such as sodium chloride or alkaline earth metal halide, such as calcium chloride or barium chloride. The antimony compounds used according to my invention are preferably prepared by the action of water on an antimony pentahalide, such as antimony pentachloride. The reaction of isomerization can be carried out in both batch and continuous operation, within temperature limits of 100° F. to 400° F. Isomerization of normal butane is preferably carried out at temperatures of 150° to 250° F.

As an example of preparing the catalytic composition used in carrying out my invention, 114 grams of antimony pentachloride are added gradually to about an equal weight of water. This causes the formation of a white precipitate which probably consists of hydrates of antimony pentoxide. This product, however, may contain, besides the hydrates of antimony pentoxide, hydrolysis products of antimony trichloride. The presence of the lower chlorides of antimony may be surmised by the detection by odor of chlorine evolved during the reaction between the water and antimony pentachloride. The white precipitate is brought upon a filter and washed with water until the filtrate is substantially free from chlorine ion, and added, under agitation, to 1½ gallons of a 10% solution of zinc chloride in water. Better results may be obtained from catalytic compositions which contain concentrated solutions of zinc chloride, for example a zinc chloride solution which is saturated at the isomerization temperature. Such composition is, for example, obtained by admixing the product from the action of about 600 grams of water on 600 grams of antimony pentachloride with 1½ gallons of a solution of zinc chloride in water saturated at 250° F. Even better isomerization results may be obtained with a catalyst prepared under similar conditions with the addition of zinc chloride in excess of that required to produce the 1½ gallons of zinc chloride solution saturated at 250° F.

In preparing the catalytic composition, metal halides other than zinc chloride may be used, either alone or in admixture with each other, or with zinc chloride. The antimony compounds may be prepared as shown above, or in any other suitable manner, for instance by treating antimony pentafluoride, antimony pentachloride hydrate or hydrochloric acid solution of antimony pentachloride with water or by decomposing the aqueous solution of an antimonic acid salt with acid; a single compound of antimony or a mixture of several compounds may be used.

The activity of the freshly prepared catalyst can be increased by mechanical stirring or by similar means causing the exposure of a greater surface to the hydrocarbon treated. The ratio of zinc chloride or the like to the antimony compound may vary within wide limits, for instance between 3:1 and 10:1, based on antimony pentachloride, the metal halide agent being in excess. This ratio is of great importance. For instance, in the case of a catalyst containing a 10% solution of zinc chloride, the percent conversion rises with increase in the relative quantity of antimony compound, to a maximum point where the ratio of zinc chloride to antimony pentachloride is about 5:1. With further increase in the relative quantity of the antimony compounds the percent conversion continually drops.

The time of reaction is of substantial importance, definite increases in conversion being obtained as the rate of throughput is decreased. The results obtained from the continuous operation are substantially similar to those obtained in batch, the time of reaction, however being shorter in the continuous operation.

It has been found that some water is carried over with the hydrocarbons leaving the reaction chamber. A corresponding amount of water may be, therefore, introduced into the reaction chamber along with the hydrocarbons, in an amount substantially equal to that leaving it, so that the composition of the catalyst remains constant.

As one example of converting normal butane into isobutane, one-third of a cubic foot of normal butane at ordinary temperature and pressure, was introduced into a reaction chamber containing one gallon of catalyst mixture consisting of 379 grams of zinc chloride in aqueous solution, and the product obtained in the above described manner from 68 grams of antimony pentachloride substantially in suspension. The reaction vessel was sealed, and the contents heated until the pressure was raised to 40 pounds per square inch. These conditions were maintained for one hour. The temperature was then allowed to drop to atmospheric conditions, and the gas was withdrawn to a receiver. This procedure was repeated twice more. The total resulting gas contained 70% of iso-butane.

In a continuous operation, normal butane was passed at the rate of three cubic feet per hour through 1½ gallons of a catalyst consisting of a solution of zinc chloride saturated at 250° F., and the product obtained from 600 grams of antimony pentachloride and an equal amount of water in the above described manner, under a gauge pressure of 50 lbs. per square inch. The resulting gas contained an average of 68.5% isobutane, which may be separated from the normal butane by fractionation, and the latter recycled.

If normal butane is treated under similar conditions with a catalyst consisting of an aqueous solution of zinc chloride without the addition of an antimony compound, substantially no isomerization is effected.

Other normal paraffinic hydrocarbons, or mixtures containing such hydrocarbons, such as naphtha composed essentially of normal paraffin hydrocarbons, can be isomerized substantially as above described according to the process of my invention, whereby, in the case of naphtha, the octane rating is substantially improved.

In my present specification and claims, the term "a metal halide known in anhydrous condition as a Friedel-Crafts agent" (or catalyst), is to be understood as including, in the anhydrous form or in the form of hydrates, $AlCl_3$, $ZnCl_2$, $FeCl_3$, $AlBr_3$, and other similar catalytically active metal halides, and mixtures of said halides. In carrying out my present process, said compounds are used at least partially dissolved in water.

Although the present invention has been described in connection with specific examples thereof, it is not intended that such examples or their details shall be regarded as limitations upon the scope of the invention except insofar as they are included in the accompanying claims.

I claim:

1. A process for isomerizing normal paraffinic hydrocarbons, which comprises treating said paraffinic hydrocarbons at isomerization temperature in the presence of a catalytic composition containing a metal halide known in anhydrous condition as a Friedel-Crafts catalyst, said metal halide being at least partly dissolved in water, admixed with an oxygen containing compound of pentavalent antimony selected from the group consisting of antimony oxide compounds obtained by the action of water on a pentahalide of antimony, antimonic acids, and antimony compounds obtained by decomposing an aqueous solution of a salt of an antimonic acid with an acid.

2. A process of isomerizing normal paraffinic hydrocarbons, which comprises treating said paraffinic hydrocarbons at isomerization temperature in the presence of a catalytic composition containing a metal halide known in anhydrous condition as a Friedel-Crafts catalyst, said metal halide being at least partly dissolved in water, admixed with a precipitate obtained by the action of water on a pentahalide of antimony.

3. A process for isomerizing normal paraffinic hydrocarbons, which comprises treating said paraffinic hydrocarbons, which comprises treating said paraffinic hydrocarbons at isomerization temperature in the presence of a catalytic composition containing a metal halide known in anhydrous condition as a Friedel-Crafts catalyst, said metal halide being at least partly dissolved in water, admixed with a precipitate obtained by the action of water on antimony pentachloride.

4. A process for isomerizing normal paraffinic hydrocarbons, which comprises treating said paraffinic hydrocarbons at isomerization temperature in the presence of a catalytic composition containing zinc chloride which is at least partly dissolved in water, admixed with a precipitate obtained by the action of water on antimony pentachloride.

5. A process for isomerizing normal paraffinic hydrocarbons, which comprises treating said paraffinic hydrocarbons at isomerization temperature in the presence of a catalytic composition containing water and zinc chloride, the zinc chloride being present in amount in excess of that required for an aqueous solution saturated at the isomerization temperature, admixed with a precipitate obtained by the action of water on antimony pentachloride.

6. A process for isomerizing normal butane, which comprises treating normal butane at a temperature of 100°–400° F. in the presence of a catalytic composition comprising zinc chloride which is at least partly dissolved in water, admixed with a precipitate obtained by the action of water on antimony pentachloride.

7. A process for isomerizing normal butane, which comprises treating normal butane at a temperature of 150°–250° F. in the presence of a catalytic composition comprising zinc chloride which is at least partly dissolved in water, admixed with a precipitate obtained by the action of water on antimony pentachloride.

8. A process for isomerizing normal butane, which comprises treating normal butane at a temperature of 100°–400° F. in the presence of a catalytic composition consisting essentially of an aqueous zinc chloride solution which is saturated at the isomerization temperature and contains an excess of undissolved zinc chloride, admixed with a precipitate obtained by the treatment of antimony pentachloride with about an equal amount of water.

9. A process for isomerizing normal butane, which comprises treating normal butane at a temperature of 150°–250° F. in the presence of a catalytic composition consisting essentially of an aqueous zinc chloride solution which is saturated at the isomerization temperature and in addition contains an excess of undissolved zinc chloride, admixed with a precipitate obtained by the treatment of antimony pentachloride with about an equal amount of water.

10. A process for isomerizing normal paraffinic hydrocarbons, which comprises treating said paraffinic hydrocarbons at temperatures between 100° F. and 400° F. in the presence of a catalytic composition containing a metal halide known in anhydrous condition as a Friedel-Crafts catalyst, said metal halide being at least partially dissolved in water, admixed with an oxygen containing compound of pentavalent antimony selected from the group consisting of antimony oxide compounds obtained by the action of water on a pentahalide of antimony, antimonic acids, and antimony compounds obtained by decomposing an aqueous solution of a salt of an antimonic acid with an acid.

11. A process for isomerizing normal paraffinic hydrocarbons, which comprises treating said paraffinic hydrocarbons while in vapor phase at temperatures between 100° F. and 400° F. in the presence of a catalytic composition containing a metal halide known in anhydrous condition as a Friedel-Crafts catalyst, said metal halide being at least partially dissolved in water, admixed with an oxygen containing compound of pentavalent antimony selected from the group consisting of antimony oxide compounds obtained by the action of water on a pentahalide of antimony, antimonic acids, and antimony compounds obtained by decomposing an aqueous solution of a salt of an antimonic acid with an acid.

12. A process for isomerizing normal paraffinic hydrocarbons, which comprises treating said paraffinic hydrocarbons at isomerization temperature in the presence of a catalytic composition containing zinc chloride which is at least partly dissolved in water, admixed with a precipitate obtained by the action of water on antimony pentachloride, the ratio of zinc chloride to the antimony pentachloride being between 3:1 and 10:1.

13. A process for isomerizing normal butane, which comprises treating said normal butane at isomerization temperature in the presence of a catalytic composition containing a metal halide known in anhydrous condition as a Friedel-Crafts catalyst, said metal halide being at least partly dissolved in water, admixed with an oxygen containing compound of pentavalent antimony selected from the group consisting of antimony oxide compounds obtained by the action of water on a pentahalide of antimony, antimonic acids, and antimony compounds obtained by decomposing an aqueous solution of a salt of an antimonic acid with an acid.

14. A process for isomerizing normal butane, which comprises treating said normal butane at isomerization temperature in the presence of a catalytic composition containing a metal halide known in anhydrous condition as a Friedel-Crafts catalyst, said metal halide being at least partly dissolved in water, admixed with a precipitate obtained by the action of water on a pentahalide of antimony.

15. A process for isomerizing normal paraffinic hydrocarbons, which comprises passing said paraffinic hydrocarbons at isomerization temperature, together with a relatively small quantity of water, through a catalytic composition containing a metal halide known in anhydrous condition as a Friedel-Crafts catalyst, said metal halide being at least partially dissolved in water, admixed with the precipitate obtained by the action of water on a pentahalide of antimony.

16. A process for isomerizing normal paraffinic hydrocarbons, which comprises treating said paraffinic hydrocarbons in vapor phase at isomerization temperature in the presence of a catalytic composition containing a metal halide known in anhydrous condition as a Friedel-Crafts catalyst said metal halide being at least partly dissolved in water, admixed with an oxygen containing compound of pentavalent antimony selected from the group consisting of antimony oxide compounds obtained by the action of water on a pentahalide of antimony, antimonic acids, and antimony compounds obtained by decomposing an aqueous solution of a salt of an antimonic acid with an acid.

17. A process for isomerizing normal paraffinic hydrocarbons, which comprises treating said paraffinic hydrocarbons in liquid phase at isomerization temperature in the presence of a catalytic composition containing a metal halide known in anhydrous condition as a Friedel-Crafts catalyst, said metal halide being at least partly dissolved in water, admixed with an oxygen containing compound of pentavalent antimony selected from the group consisting of antimony oxide compounds obtained by the action of water on a pentahalide of antimony, antimonic acids, and antimony compounds obtained by decomposing an aqueous solution of a salt of an antimonic acid with an acid.

18. A process for isomerizing normal paraffinic hydrocarbons, which comprises treating said paraffinic hydrocarbons in liquid-vapor phase at isomerization temperature in the presence of a catalytic composition containing a metal halide known in anhydrous condition as a Friedel-Crafts catalyst, said metal halide being at least partly dissolved in water, admixed with an oxygen containing compound of pentavalent antimony selected from the group consisting of antimony oxide compounds obtained by the action of water on a pentahalide of antimony, antimonic acids, and antimony compounds obtained by decomposing an aqueous solution of a salt of an antimonic acid with an acid.

HEINZ HEINEMANN.